United States Patent
Clute et al.

(10) Patent No.: US 9,346,434 B2
(45) Date of Patent: May 24, 2016

(54) SEAT BELT RETRACTOR HAVING AN INERTIA SENSOR WITH A PIVOTAL SENSOR HOUSING

(75) Inventors: Günter Clute, Elmshorn (DE); Milos Cekic, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 247 days.

(21) Appl. No.: 14/008,691

(22) PCT Filed: Mar. 14, 2012

(86) PCT No.: PCT/EP2012/001140
§ 371 (c)(1),
(2), (4) Date: Oct. 31, 2013

(87) PCT Pub. No.: WO2012/130389
PCT Pub. Date: Oct. 4, 2012

(65) Prior Publication Data
US 2014/0042257 A1 Feb. 13, 2014

(30) Foreign Application Priority Data
Apr. 1, 2011 (DE) .......................... 10 2011 015 862

(51) Int. Cl.
*B60R 22/40* (2006.01)

(52) U.S. Cl.
CPC ........... *B60R 22/40* (2013.01); *B60R 2022/402* (2013.01)

(58) Field of Classification Search
USPC ........................................................ 242/384
See application file for complete search history.

(56) References Cited

U.S. PATENT DOCUMENTS

| 3,921,931 | A | * | 11/1975 | Levasseur | ............... | B60R 22/40 |
| | | | | | | 242/384.6 |
| 4,238,087 | A | * | 12/1980 | Makishima | ............. | B60R 22/40 |
| | | | | | | 242/384.2 |
| 5,791,582 | A | * | 8/1998 | Ernst | ....................... | B60R 22/40 |
| | | | | | | 242/384.4 |
| 6,470,746 | B1 | * | 10/2002 | Murayama | ............. | B60R 22/40 |
| | | | | | | 297/480 |

(Continued)

FOREIGN PATENT DOCUMENTS

DE 43 15 072 A1 11/1994
DE 201 14 710 U1 3/2002

(Continued)

OTHER PUBLICATIONS

German Examination Report—Mar. 2, 2012.

(Continued)

*Primary Examiner* — Sang Kim
(74) *Attorney, Agent, or Firm* — Brinks Gilson & Lione

(57) ABSTRACT

A seat belt retractor (1) with a vehicle-sensitive, inertia sensor (4), and a blocking device to block belt extraction movement of a belt shaft (3) controllable by an inertia sensor (4). The inertia sensor (4) has a sensor housing (5) with a gearing (7) mounted to swivel, blocking element (10) coupled on the belt shaft (3), engages in the gearing (7) in a first position to fix the sensor housing (5) and swivels during a belt retraction movement from a first position into a second position where it does not engage in the gearing (7). A guide is provided in the form of a longitudinal recess (12) with a variable width. The blocking element (10) engages with a protrusion (14) in the recess (12) and during the rotation of the belt shaft (3) to cause relative movement in the longitudinal direction of the recess (12).

7 Claims, 6 Drawing Sheets

(56) References Cited

U.S. PATENT DOCUMENTS

| | | | | | |
|---|---|---|---|---|---|
| 6,578,419 | B1* | 6/2003 | Murayama | ............. | B60R 22/40 242/384.6 |
| 7,384,014 | B2* | 6/2008 | Ver Hoven | ............ | B60R 22/415 242/382.2 |
| 7,537,179 | B2* | 5/2009 | Schmidt | ................. | B60R 22/40 242/384 |
| 7,828,391 | B2* | 11/2010 | Hibata | .................... | B60R 22/40 297/474 |
| 8,308,099 | B2* | 11/2012 | Ono | ....................... | B60R 22/40 242/384.1 |
| 8,893,999 | B2* | 11/2014 | Yamada | ................. | B60R 22/40 242/383.2 |
| 2004/0188995 | A1* | 9/2004 | Clute | ................... | B60R 22/341 280/806 |
| 2006/0243846 | A1* | 11/2006 | Clute | .................... | B60R 22/40 242/384.6 |
| 2008/0217458 | A1* | 9/2008 | Clute | ..................... | B60R 22/40 242/384.6 |
| 2008/0230644 | A1* | 9/2008 | Clute | ..................... | B60R 22/40 242/382.2 |

FOREIGN PATENT DOCUMENTS

| | | |
|---|---|---|
| DE | 101 43 677 A1 | 7/2003 |
| DE | 10 2005 029 487 B4 | 11/2008 |
| JP | 10-175511 | 6/1998 |
| JP | 2009-262723 | 11/2009 |

OTHER PUBLICATIONS

PCT International Search Report—May 30, 2012.

* cited by examiner

SEAT BELT RETRACTOR HAVING AN INERTIA SENSOR WITH A PIVOTAL SENSOR HOUSING

CROSS REFERENCE TO RELATED APPLICATIONS

This application claims priority to German Patent Application No. 10 2011 015 862.6, filed Apr. 1, 2011, and PCT/EP2012/001140, filed Mar. 14, 2012.

FIELD OF THE INVENTION

The invention relates to a motor vehicle seat belt retractor having an inertia sensor with a swiveling sensor housing.

BACKGROUND

Inertia sensors are used in seat belt retractors, for example, to control a blocking device upon the exceeding of a predetermined vehicle deceleration. The inertia sensor itself has for that purpose an inertia mass placed in a sensor housing which is deflected in the sensor housing upon a predetermined vehicle deceleration which is determined by the suspension of the inertia mass and the mass of the inertia mass. Upon deflection, the inertial mass raises a blocking lever, which in order to control the blocking device guides into an externally geared control disc rotatably mounted on the belt shaft of the seat belt retractor and stops the control disc with respect to the belt shaft. The predetermined vehicle deceleration, or also a threshold of the inertial sensor at which the seat belt retractor must block, is an essential, safety-related, functional criterion of the seat belt retractor and is therefore legally prescribed. In order for the seat belt retractor to meet the legal requirements, the response threshold may not in any case be so changed, that the seat belt retractor is first blocked in the direction of belt extraction above the predetermined vehicle deceleration.

Basically seat belt retractors with inertia sensors having a swiveling sensor housing are always used when the seat belt retractors are to be placed in a vehicle structure that can have an adjustable incline or in general perform their function in various angular orientations. For example, a seat belt retractor may be mounted to an occupant's seat which has an adjustable reclining or adjusted position. For such applications, the inertial sensor needs to respond to the vehicle decelerations in a similar manner over a range of adjustment positions of the retractor. Accordingly, a swiveling sensor housing may be used which becomes adjusted in response to a change in the position of the retractor frame. Because of the swiveling sensor housings the inertia sensor can swivel into various angular positions with respect to the seat belt retractor, such that it can exhibit a defined angular orientation to the vehicle or to the direction of gravity independent of the incline of the seat belt retractor.

One problem of such inertia sensors with swiveling sensor housings is that the sensor housing itself can swivel with respect to the seat belt retractor, e.g. during a strong braking of the vehicle, whereupon in this case the response threshold of the inertia sensor can change, since the inertia mass also executes the swivel movement of the sensor housing and thus only deflects in a delayed manner.

In order that the response threshold is not unintentionally changed because of the above-stated problem, it is known from DE 10 2005 029 487 B4 how to fix the sensor housing during the belt extraction movement by means of a blocking element. The blocking element is positioned on the frame of the seat belt retractor so as to swivel and engages into an outer gearing of the sensor housing in a position blocking the sensor housing. The movement of the blocking lever is controlled in this solution by a control lever, frictionally connected on the belt shaft, which engages into a control contour of the blocking lever and guides the blocking lever out of the gearing of the sensor housing during the belt retraction movement. Furthermore, the blocking element is spring-loaded in the direction of the engaged position into the gearing of the sensor housing by means of a spring supported on the frame of the seat belt retractor, so that after the end of the belt retraction movement, the blocking element again travels independently into the gearing of the sensor housing and fixes the sensor housing. As a result, the return movement of the blocking element is facilitated in particular in this case, since the control lever is connected to the belt shaft by means of a friction coupling which exhibits higher dynamic friction coefficients in relation to the static friction coefficients.

Needed overall to design this system is a fine tuning of the spring loading of the blocking element and the connection of the control lever to the belt shaft and also a very good guiding of the control lever into the control contour of the blocking element.

SUMMARY OF THE INVENTION

The object of the invention is to make available a seat belt retractor of this type with a functionally certain fixing of the sensor housing which is designed to be constructed simply.

The object is inventively achieved by the seat belt retractor with the features described herein. Other preferred embodiments of the invention can be found in the figures, and the associated description.

It is proposed according to the basic idea of the invention, that a forcible guide in the form of along arcuate recess with a varying width in the longitudinal direction is provided, which is powered by the turning of the belt shaft, and that the blocking element engages in this recess with a protrusion.

By means of the inventive solution, the movement of the blocking element is also controlled via the forcible guide in addition to the friction connection to the belt shaft, wherein the movement itself is not controlled by the forcible guide in the form of a long recess with a varying width but rather only the movement forced by the friction connection of the blocking element on the belt shaft is either blocked or facilitated. Since the forcible guide is powered by the turning of the belt shaft, the relative location of the protrusion to the forcible guide changes, so that at certain belt extraction lengths, the protrusion, and thus the blocking element, can be either moved or forced into one of the positions depending on the width of the recess at the location at which the protrusion is situated. Thus the position of the blocking element does not depend on whether the belt is extracted or retracted, but on whether the forcible guide facilitates or prevents the movement by means of the dimension of the width at the respective location. In so far as the width of the recess does not enable any movement of the protrusion perpendicular to the recess, the protrusion, and thus the blocking element, can be forced into a movement defined by the course of the recess. It is possible, because of the impetus of the forcible guide, to control the movement of the slightly movable, but in relation to the rotating movement of the belt shaft apparently fixed protrusion.

It is further proposed, that the recess exhibits a narrow section which passes by the protrusion when the seat belt is almost rolled up, wherein the blocking element is forced into the second position by the protrusion which is situated at the narrow point. When putting on the belt with a very short extraction length, the blocking element is forced as a result, at least for a short time, into the second position, in which the swiveling sensor housing is not fixed. Before the fixing, the sensor housing can, as a result, align for a brief time under the influence of gravity during the following belt extraction movement and is ultimately situated, as a result, in an alignment correct for the function.

It is also recommended in this case that the recess is divided by the narrow point into a first section of a greater width and a second section of a lesser width, and that the first section is so dimensioned that the protrusion can execute in the first section a perpendicular movement facilitating the movement of the blocking element between two positions, and that the second section is so dimensioned that the protrusion cannot execute a perpendicular movement and as a result is forced into a position in which the blocking element is forced either into the first or into the second position. The first section corresponds to the section in which the protrusion is moved during normal wearing of the seat belt, while the second position corresponds to the section in which the protrusion is moved into the park position during removal of a very short belt extraction length.

It is also proposed that the inertia sensor encompasses a blocking lever able to be deflected by an inertia mass to control the blocking device, and that in order to fix the blocking lever a control disc powered by the belt shaft is provided with a control contour coming to rest on the blocking lever at predetermined belt extraction lengths, and that the recess is placed in the control disc. By fixing the blocking lever with the use of a control disc, the vehicle-sensitive sensor can be deactivated during belt intake after a predetermined belt extraction length, so that the inertia sensor does not control the blocking device independently of the position of the sensor housing and the influencing accelerations. As a result the inertia sensor is practically shut off. Since the deactivation of the inertia sensor occurs by means of a control disc powered by the belt shaft depending on the belt extraction length, in this case the control disc powered by the belt shaft can also simultaneously be used for the above-described forcible guiding of the protrusion by means of a recess positioned therein.

It is further proposed that the control contour exhibits a cam which fixes the blocking lever by a mechanism at predetermined belt extraction lengths, and that the cam is so positioned that the belt extraction length at which the blocking lever is fixed is equal to the belt extraction length at which the blocking element is forced into the second position by the protrusion located in the narrow point. By means of the proposed solution the inertia sensor is simultaneously deactivated by the fixing of the blocking lever and by a simultaneous release of the swiveling sensor housing at a defined belt extraction length, so that the swiveling sensor housing can align at this belt extraction length without the possibility of the blocking device being thereby controlled by a deflection of the blocking lever of the inertia sensor.

BRIEF DESCRIPTION OF THE DRAWINGS

In the following section the invention will be explained using preferred embodiments with reference to the attached figures. Shown thereby.

DETAILED DESCRIPTION

Figure 1:
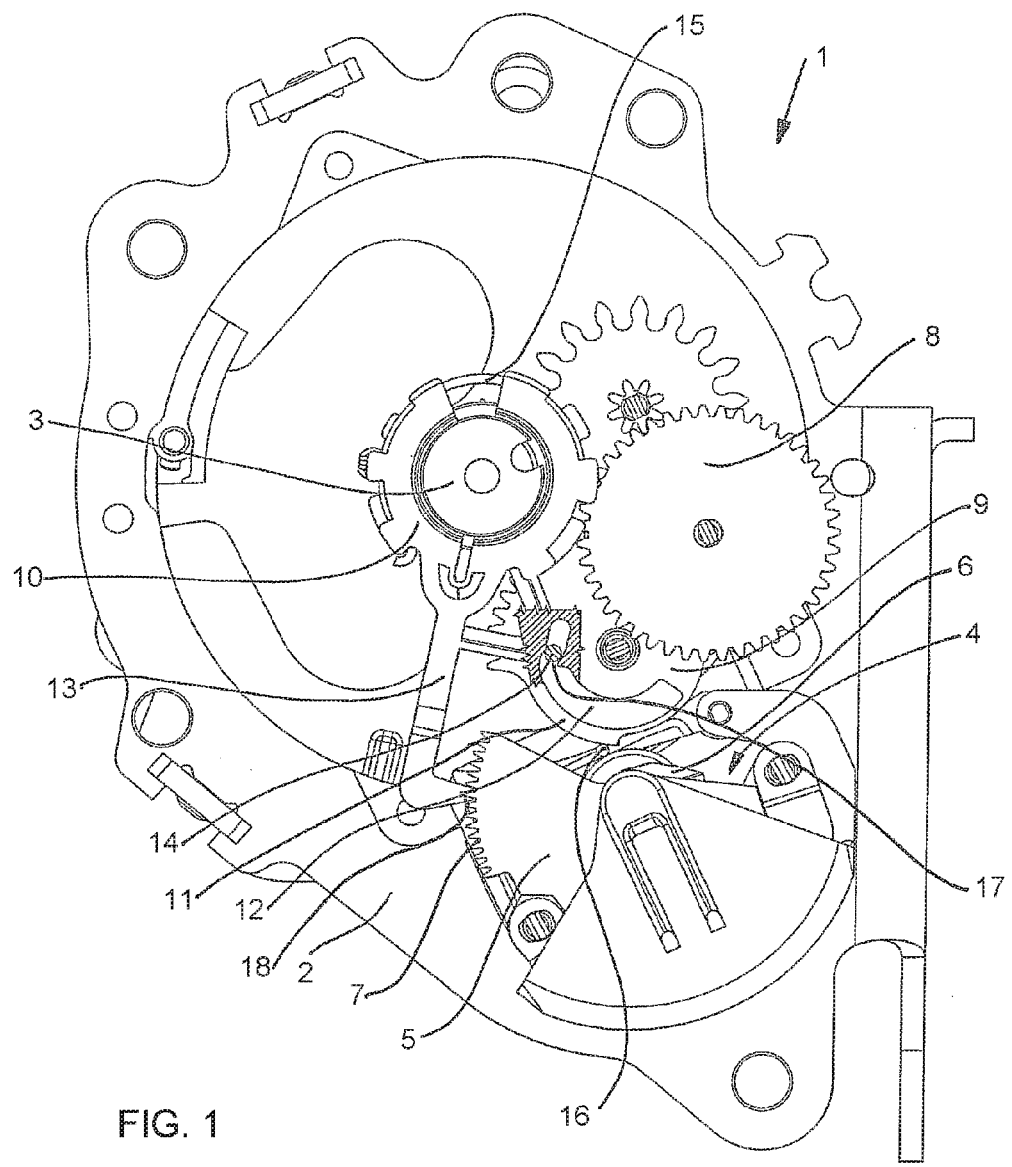
FIG. 1 illustrates a seat belt retractor with a swiveling sensor housing and a blocking element in a first position.

Recognizable in the side view in FIG. 1 is an inventively constructed seat belt retractor 1 for rolling and storing a seat belt that is not shown. The seat belt retractor 1 has a frame 2 in which a belt shaft 3 is positioned so as to rotate, on which belt shaft the seat belt can wrap. An inertia sensor 4 is provided on the frame 2 which includes an inertia mass 6 mounted in a swiveling sensor housing 5. The inertia mass 6 rests on a blocking lever 16 mounted on the inertial sensor 4 so as to swivel, which upon the exceeding of a predetermined deceleration value is swiveled by the inertial mass 6 deflected as a result and guides into a non-depicted control disc with outer gearing for control of a likewise non-depicted blocking device for locking belt shaft 3.

The sensor housing 5 is mounted on the frame 2 so as to swivel, and upon a change of the inclination angle of the frame 2 can as a result align itself because of gravity, as is required, for example, with seat belt retractors that are integrated into the seat. The swiveling sensor housing 5 is also provided with an outer gearing by means of which the sensor housing 5 can be fixed, as will later be described.

A control disc 9 with an outer control contour in the form of a cam is provided to fix the blocking lever 16 of the inertia sensor 4 which is coupled with the belt shaft 3 via a gear 8. As a result, the control disc 9 executes a turning movement supporting the turning movement of the belt shaft 3 during which it comes to rest with the cam on the blocking lever 16 and as a result prevents the deflection of the blocking lever 16 in a range of the belt extraction length predetermined by the dimensioning of the cam. The inertia sensor 4 can practically be turned off.

Also provided is a blocking element 10 frictionally coupled via a ring spring 15 to the belt shaft 3 which exhibits a radial arm 13 with a gearing 18. Because of the frictional coupling of the blocking element 10 it is carried along as a dependency of the direction of rotation of the belt shaft 3 counterclockwise or clockwise, and in a first position with the gearing 18 is thereby introduced into the gearing (sector gear) 7 of the sensor housing 5, whereupon the sensor housing 5 is again fixed. With a clockwise turning of the belt shaft 3, namely during belt retraction, the blocking element 10 is moved clockwise into a second position in which the gearings 18 and 7 do not engage each other, and as a result the sensor housing is released. The first position of the blocking element 10 can be recognized in FIG. 1 and the second position in FIG. 2.

To that extent, seat belt retractor 1 is state of the art.

Also provided on the control disc 9 is a forcible guide in the form of an arc-shaped recess 12 with a variable width along its longitudinal direction (i.e. in the end circumferential direction relative to the axis of rotation of the control disc 9) in which a protrusion 14 in the form of a stud positioned on the blocking element 10 is guided. Since the control disc 9 is powered by the belt shaft 3 via the gear 8, the recess 12 is also moved with respect to the protrusion 14. This is especially advantageous, since, aside from it swiveling, the protrusion is to be viewed as fixed in relation to the rotation of the belt shaft 3. The width of the recess 12 is so dimensioned along its course in the longitudinal direction that the above-described movement of the blocking element 10 as a dependency of the relative arrangement of the protrusion 14 in the recess 12 is either allowed or limited.

Figure 2:
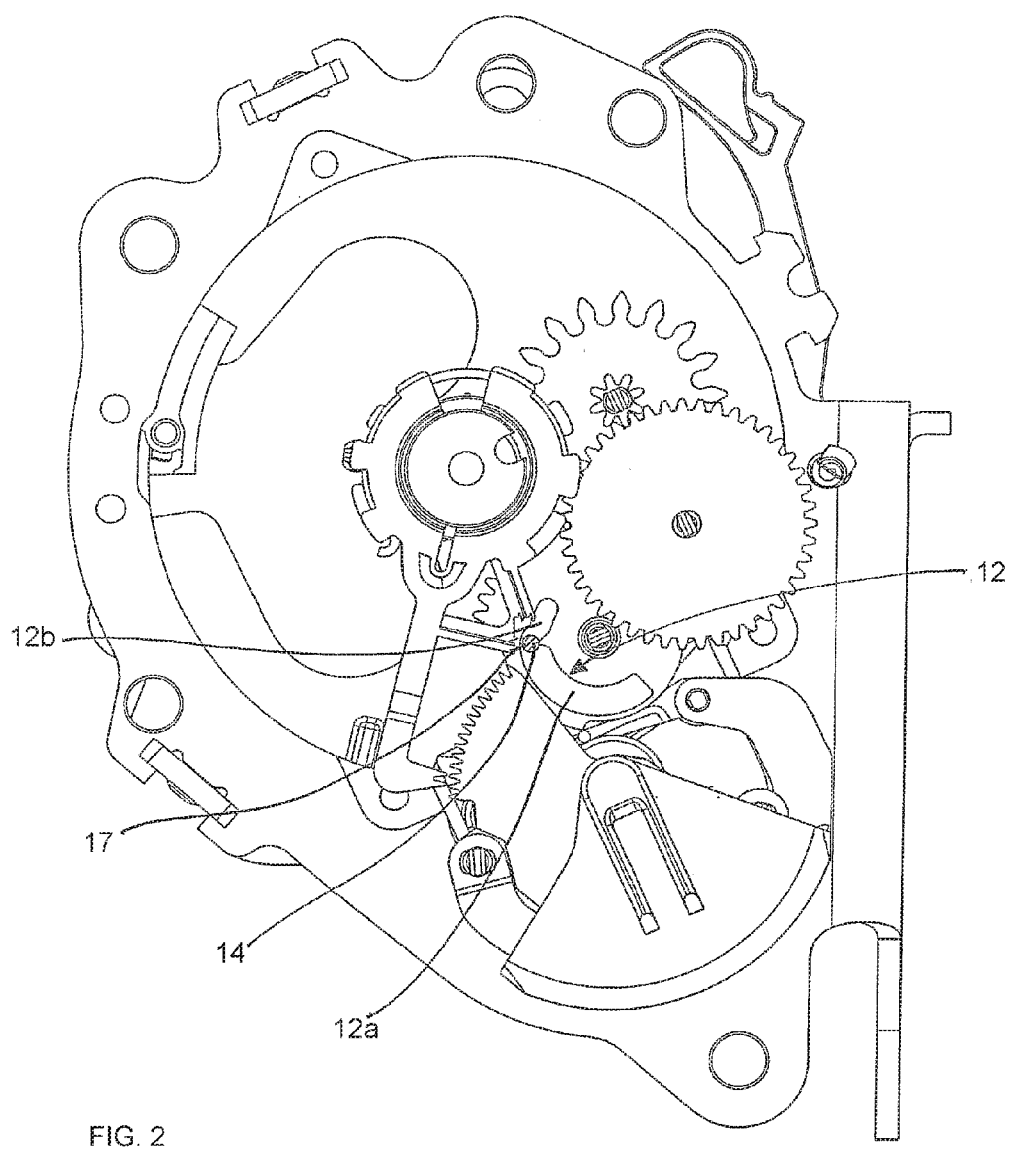
FIG. 2 illustrates the seat belt retractor if FIG. 1 in a second position.

The recess 12 can basically be divided into a first section 12a and a second section 12b which are separated from each other by a narrow point 17 as can be seen in FIG. 2. The first section 12a is longer in the longitudinal arcuate direction and exhibits a double or triple the width (radial dimension relative to the center of rotation of the control disk 9) of the protrusion 14, while the narrow section 17 and the second section 12b exhibit only a slightly larger width than the protrusion 14.

Recognizable in FIG. 1 is a position of the control disc 9 after a slight extraction of the seat belt from a park position P in which the protrusion 14 is located in the second section 12b shortly before the narrow point 17. The protrusion 14 is forced because of the narrow width of the recess 12 in the second section 12b into a position in which the blocking element 10 engages with the gearing 18 located on the end of the radial arm 13 into the gearing 7 of the sensor housing 5 and as a result fixes the sensor housing 5. The control disc 9 simultaneously rests with the cam on the blocking lever 16 of the inertia sensor 4 and thereby blocks the blocking lever 16. The inertia sensor 4 is as a result practically shut off. Upon a further extraction of the seat belt, the control disc 9 turns further clockwise and thereby reaches the position shown in FIG. 2 in which the protrusion 14 is located precisely at the narrow point 17. Due to the shape of the recess 12 in the region of the narrow point 17, the protrusion 14 is thereby forced outward, so that the blocking element 10 swivels with the gearing 18 out of the gearing 7 of the sensor housing 5 and releases the sensor housing 5. The narrow point 17 is thereby so positioned that the belt extraction length at which the protrusion 14 is located at the narrow point 17 is identical to the belt extraction length at which the blocking lever 16 is again released by the cam that is moved past it.

Figure 3:
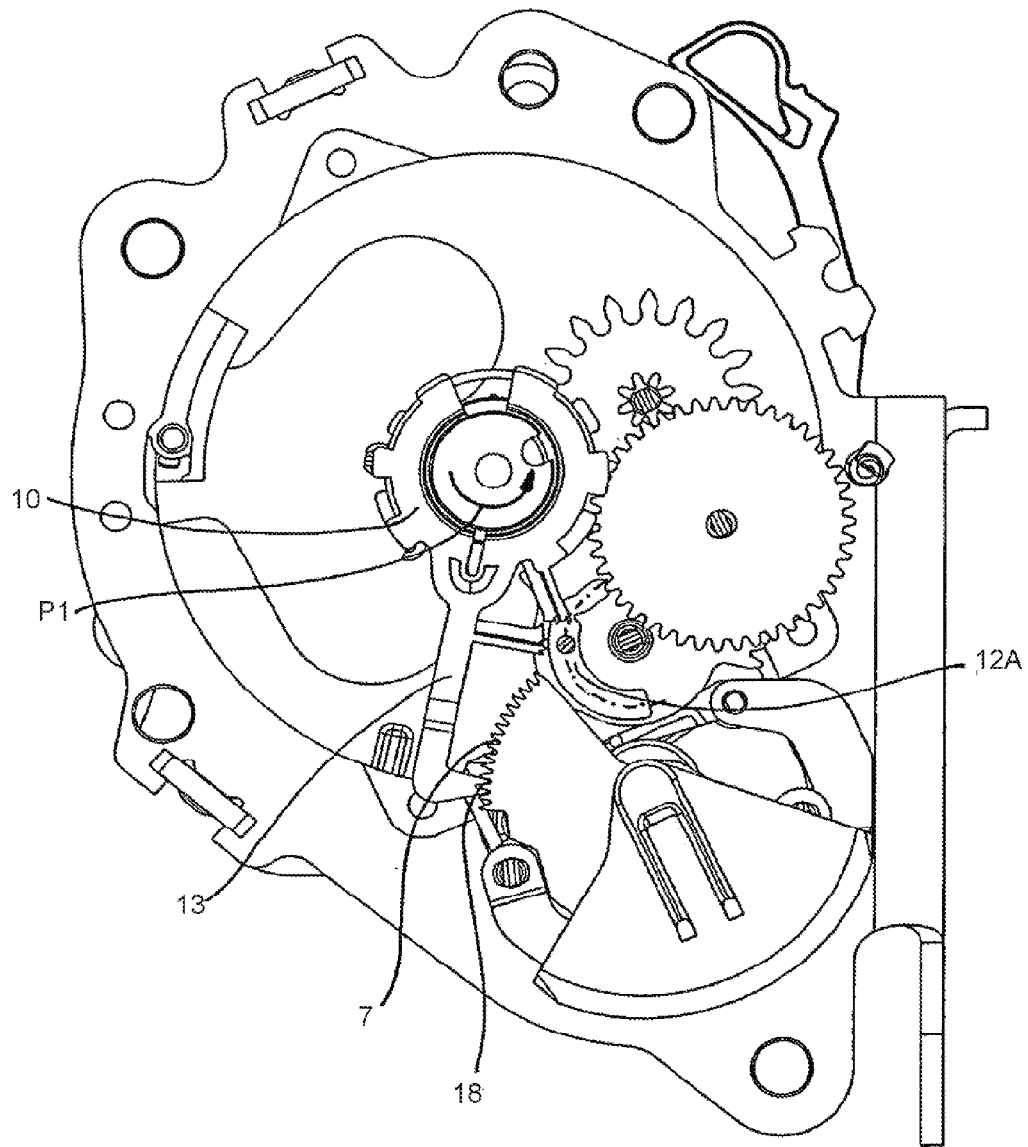
FIG. 3 illustrates the seat belt retractor if FIG. 1 in a third position.

With another turn of the seat belt (not shown) in the direction of extraction, the control disc 9 is twisted further clockwise so that the protrusion 14 enters the first section 12a of the recess 12 with a larger width, and the blocking lever 16 is freely movable because of the no longer adjacent cam of the control contour 11. Due to the greater width of the first section 12a the protrusion 14 can execute a movement perpendicular to the recess 12, as recognizable in the FIGS. 3 and 4.

Figure 4:
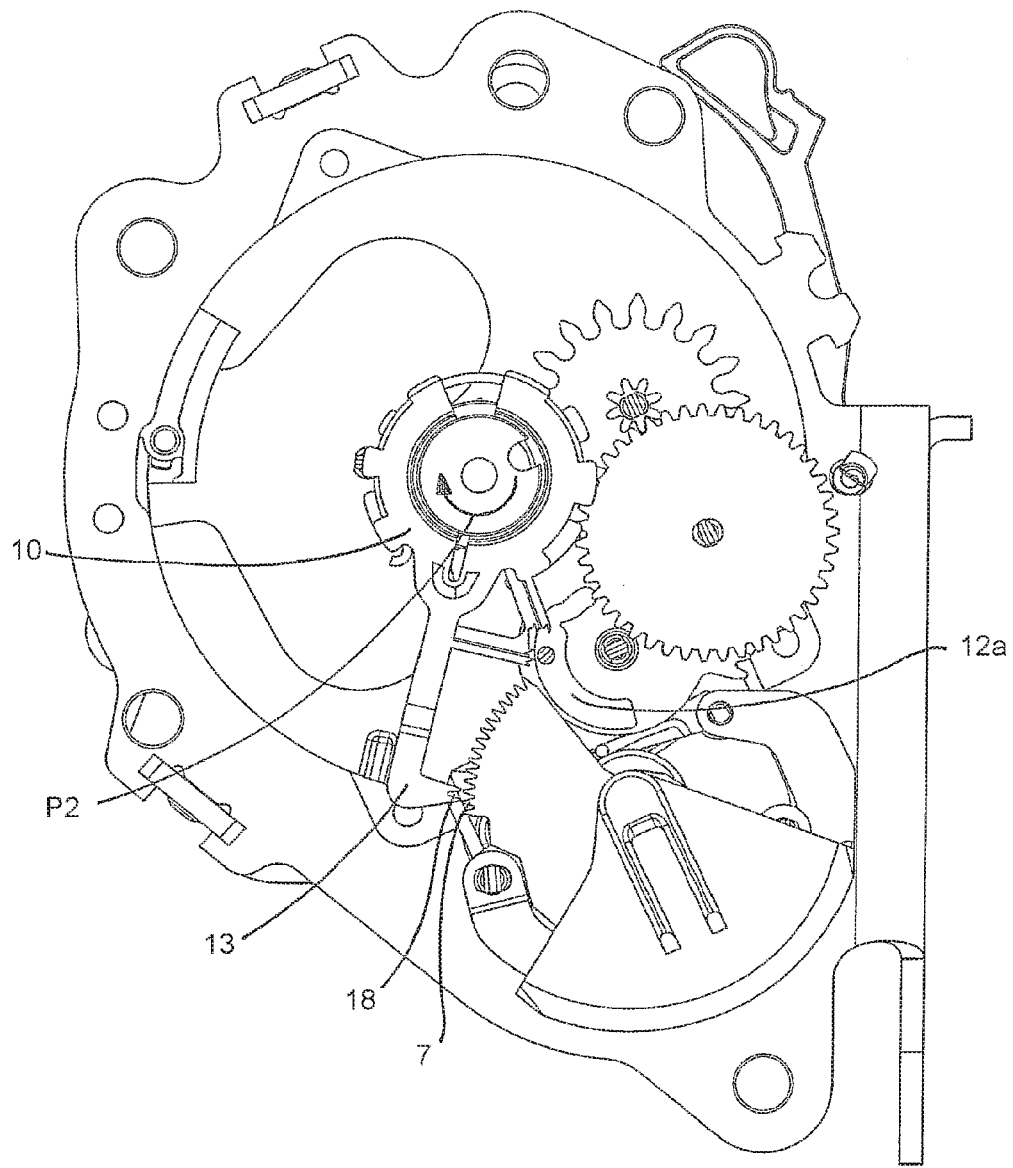
FIG. 4 illustrates the seat belt retractor if FIG. 1 in a fourth position.

The blocking element 10 is carried along in this position of the protrusion 14 due to the friction connection to the belt shaft 3 as a dependency of the direction of rotation of the belt shaft 3 in the belt retraction direction P1 or in the belt extraction direction P2, and as a result engages with the gearing 18 into the gearing 7 (see FIG. 3) or alternatively releases the sensor housing 5 (see FIG. 4).

Figure 5:
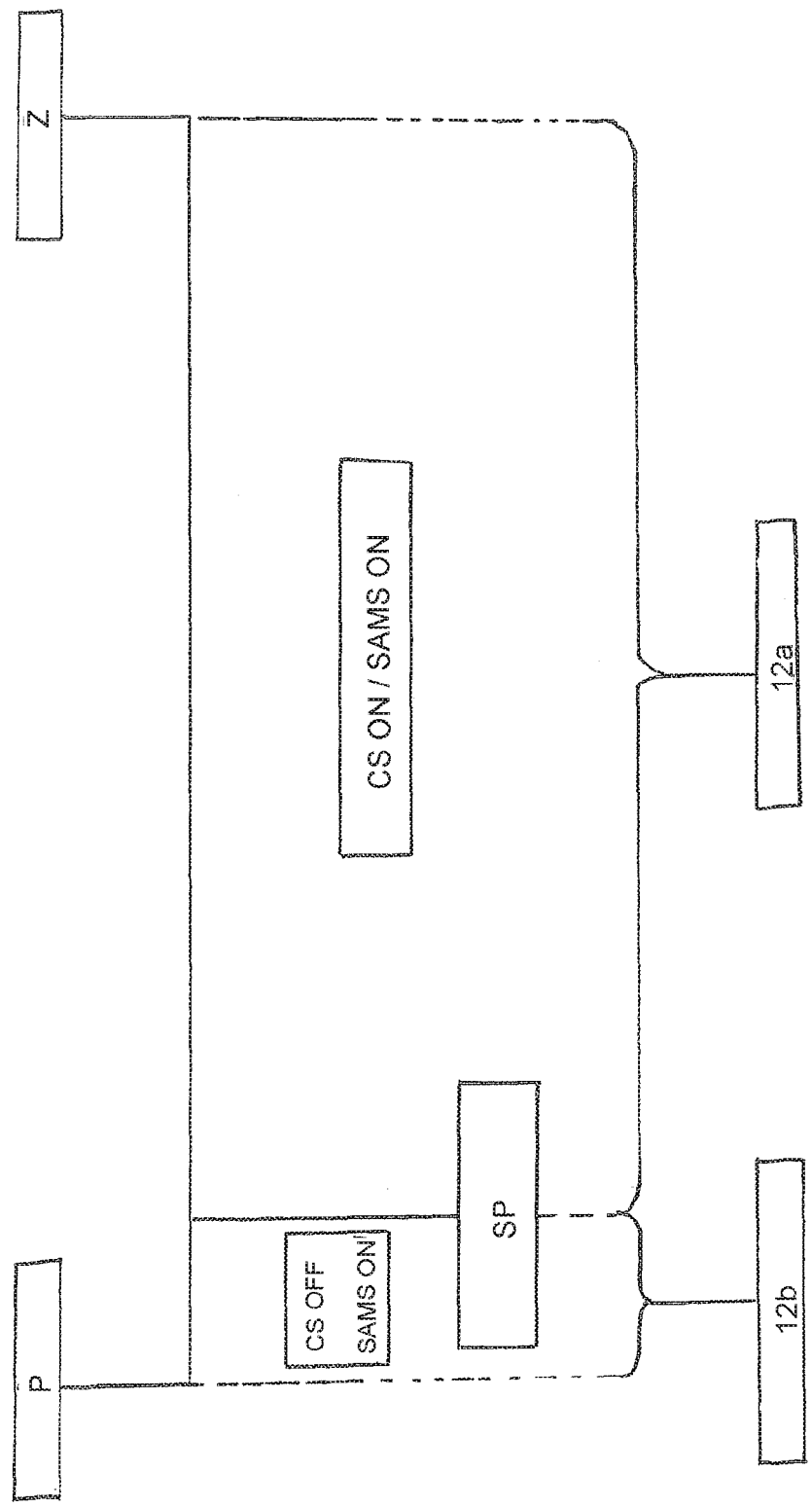
FIG. 5 is a schematic depiction of a first blocking condition of the swiveling sensor housing and the inertia sensor in accordance with this invention between the park position and the complete belt extraction.
Figure 6:
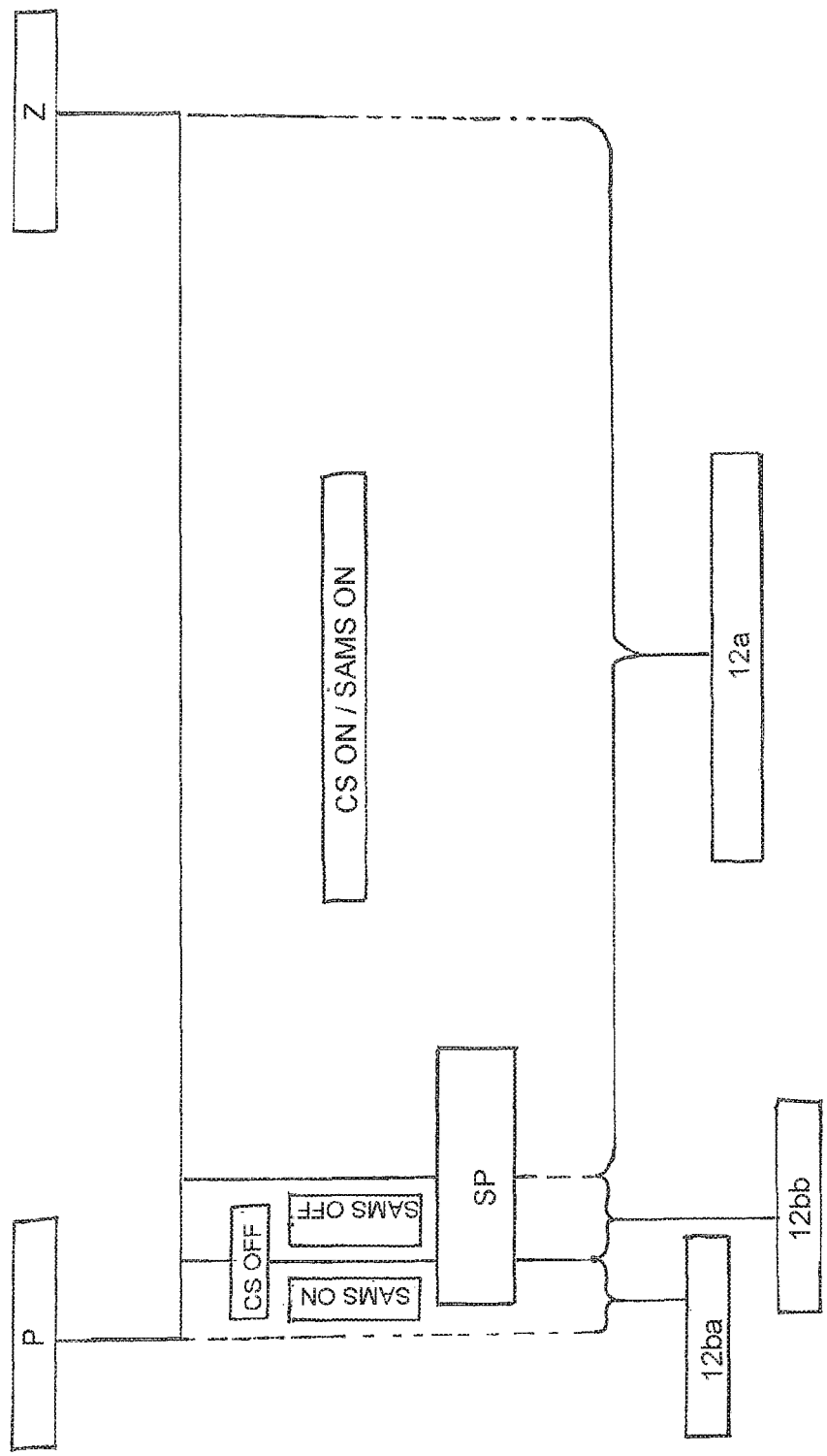
FIG. 6 is a schematic depiction of a second blocking condition of the swiveling sensor housing and the inertia sensor in accordance with this invention between the park position and the complete belt extraction.

Recognizable in FIGS. 5 and 6 are the schematic switching states between the park position P and the completely extended belt extraction length Z.

The depiction in FIG. 5 corresponds to the above-described switching sequence. The inertial sensor (CS sensor) 4 is shut off between the park position P up to the switch point SP by the fixing of the blocking lever 16 (CS Off), while the sensor housing 5 is simultaneously fixed by the blocking element 10 engaging with the gearing 18 into the gearing 7 (SAMS Off). The protrusion 14 is moved in this area in the second section 12b.

From the switch point SP up to the complete extraction Z of the safety belt, the inertia sensor 4 is, as intended, operational by means of the release of the blocking lever 16 (CS On), and the blocking element 10 is movable such that the sensor housing 5 is fixed or released according to the direction of rotation of the belt shaft 3 (SAMS On). The area between the switching point SP and the complete extraction Z corresponds to the area in which the recess 12 with section 12a is guided past the protrusion 14.

FIG. 6 shows a further developed switching mechanism in which the blocking element 10 in section 12b is forced for only a short time, in sub-section 12bb, with the gearing 18 into the gearing 7 of the sensor housing 5 (SAMS Off). During the remaining belt retraction movement, the engaging protrusion 14 is forced outward in sub-section 12ba and the blocking element 10 with the gearing 18 is steered out of the gearing 7 (SAMs On). The movement of the blocking element 10 is controlled in the second section 12b solely by the shape of the sub-sections 12ba and 12bb and is in particular independent of the direction of rotation P1 or P2 of the belt shaft 3.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor with an incline-adjustable, vehicle-sensitive, inertial sensor for seat-integrated placement in a motor vehicle, comprising a blocking device controllable by the inertial sensor for blocking a belt extraction movement of a belt shaft of the seat belt retractor, wherein the inertial sensor has a swiveling sensor housing mounted on a frame of the seat belt retractor with a gearing,
   a blocking element mounted to swivel on the frame and frictionally coupled to the belt shaft, which engages in a first position to fix the sensor housing in the gearing and swivels from the first position into a second position because of the friction connection with the belt shaft during a seat belt retraction movement in which it does not engage in the gearing, and
   a forcible guide on the seat belt retractor in the form of an arcuate recess defining an arc, with a variable width along the arc defined by the arcuate recess, which is powered by the turning of the belt shaft, wherein the arcuate recess is divided by a narrow section into a first section of a larger width and a second section of a smaller width, the smaller width being smaller than the larger width,
   wherein the blocking element engages with a protrusion in the arcuate recess and during the turning of the belt shaft executes a relative movement in the longitudinal direction of the arcuate recess.

2. The seat belt retractor according to claim 1, wherein the arcuate recess forms a narrow section which passes by the protrusion with an almost rolled-up seat belt, wherein the blocking element is displaced into the second position by the protrusion located at the narrow section.

3. The seat belt retractor according to claim 2, wherein the control contour forms a cam which fixes the blocking lever by a mechanism at predetermined belt extraction lengths, and that the cam is so positioned that the belt extraction length at which the blocking lever is fixed is equal to the belt extraction length at which the blocking element is displaced into the second position (II) by the protrusion located at the narrow section.

4. The seat belt retractor according to claim 1, wherein the inertial sensor includes a blocking lever controllable by an inertia mass to control the blocking device, and that to fix the blocking lever a control disc is provided which powered by the belt shaft and has a control contour moving to rest on the blocking lever at a predetermined belt extraction length, and that the recess is positioned in the control disc.

5. A seat belt retractor with an incline-adjustable, vehicle-sensitive, inertial sensor for seat-integrated placement in a motor vehicle, comprising a blocking device controllable by the inertial sensor for blocking a belt extraction movement of a belt shaft of the seat belt retractor, wherein the inertial sensor has a swiveling sensor housing mounted on a frame of the seat belt retractor with a gearing, a blocking element mounted to swivel on the frame and frictionally coupled to the belt shaft, which engages in a first position to fix the sensor housing in the gearing and swivels from the first position into a second position because of the friction connection with the belt shaft during a seat belt retraction movement in which it does not engage in the gearing, a forcible guide on the seat belt retractor in the form of an arcuate recess, with a variable width along a longitudinal direction of the arcuate recess which is powered by the turning of the belt shaft, and the blocking element engaging with a protrusion in the arcuate recess and during the turning of the belt shaft executing a relative movement in the longitudinal direction of the arcuate recess, wherein the recess forms a narrow section which passes by the protrusion with an almost rolled-up seat belt, wherein the blocking element is displaced into the second position by the protrusion located at the narrow section wherein the recess is divided by the narrow section into a first section of a larger width and a second section of a smaller width, the first section being so dimensioned that the first section allows the protrusion to undergo a lateral oscillation in the first section facilitating the movement of the blocking element between the first and second positions, and the second section being so dimensioned that the second section prevents the protrusion from executing a lateral oscillation in the second section and forces the protrusion into a position in which the blocking element is displaced either into the first position or into the second position.

6. The seat belt retractor according to claim 5, wherein the belt extraction movement is divided into a first region corresponding to extraction movement greater than a predetermined extraction movement of the belt shaft and a second region corresponding to extraction movement less than the first region, the first region encompassing belt extraction associated with a seat belt coupled to the belt shaft being worn by an occupant of the motor vehicle, and wherein belt shaft movement in the first region positions the protrusion in the first section, and belt shaft movement in the second region positions the protrusion in the second section.

7. The seat belt retractor according to claim 6, wherein the sensor housing is permitted to self align when the protrusion is in the second section.

* * * * *